United States Patent
Maeno

(10) Patent No.: US 7,508,585 B2
(45) Date of Patent: Mar. 24, 2009

(54) DIFFRACTION OPTICAL ELEMENT AND PRODUCTION METHOD THEREOF

(75) Inventor: Yoshinori Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 259 days.

(21) Appl. No.: 11/447,001

(22) Filed: Jun. 6, 2006

(65) Prior Publication Data

US 2006/0279844 A1 Dec. 14, 2006

(30) Foreign Application Priority Data

Jun. 8, 2005 (JP) .............................. 2005-167918

(51) Int. Cl.
*G02B 5/18* (2006.01)
(52) U.S. Cl. ....................... 359/575; 359/571
(58) Field of Classification Search ................. 359/571, 359/572, 573, 575, 566
See application file for complete search history.

(56) References Cited

U.S. PATENT DOCUMENTS 5,227,915 A * 7/1993 Grossinger et al. .......... 359/565
5,606,434 A * 2/1997 Feldman et al. ................ 359/3

FOREIGN PATENT DOCUMENTS

JP 11-014813 1/1999

OTHER PUBLICATIONS

Sasaki et al., "Packing Technologies for Precise Alignment of Light Sources and Silicon Microlense" Translation of Japan Institute of Electronics Packaging, vol. 5, No. 5, pp. 466-472 (2002).
Orihara et al., "Optimization and application of hybrid-level binary zone plates," Applied Optics, vol. 40, No. 32, pp. 5877-5885 (2001).

* cited by examiner

*Primary Examiner*—Alessandro Amari
(74) *Attorney, Agent, or Firm*—Venable LLP; Michael A. Sartori; Justine A. Gozzi

(57) ABSTRACT

The diffraction optical element production method includes a first step of etching an area which becomes a seventh step of a seven-step staircase shape and an area which becomes a third step of a three-step staircase shape by a depth 2L; a second step of etching areas which become second, fourth, and sixth steps of the seven-step staircase shape and an area which becomes a first step of the three-step staircase shape by a depth L; a third step of etching areas which become fifth to seventh steps of the seven-step staircase shape and areas which become second and third steps of the three-step staircase shape by the depth 2L; and a fourth step of etching areas which become third to seventh steps of the seven-step staircase shape and areas which become second and third steps of the three-step staircase shape by the depth 2L.

4 Claims, 11 Drawing Sheets

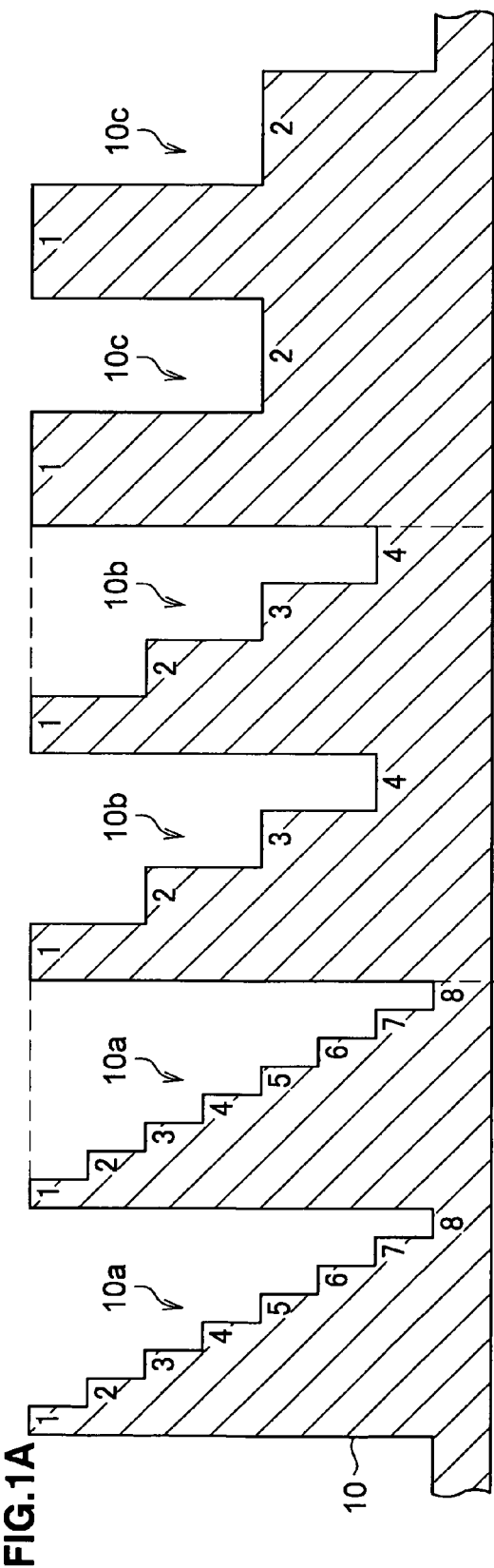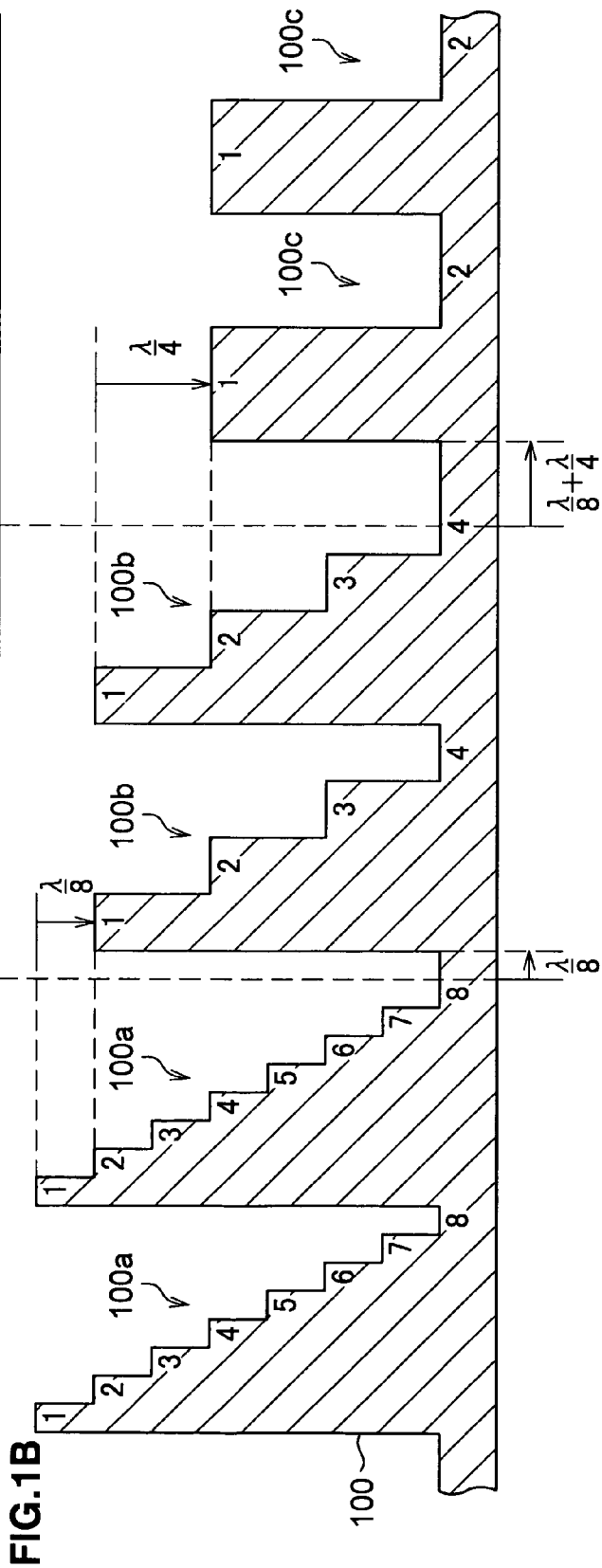

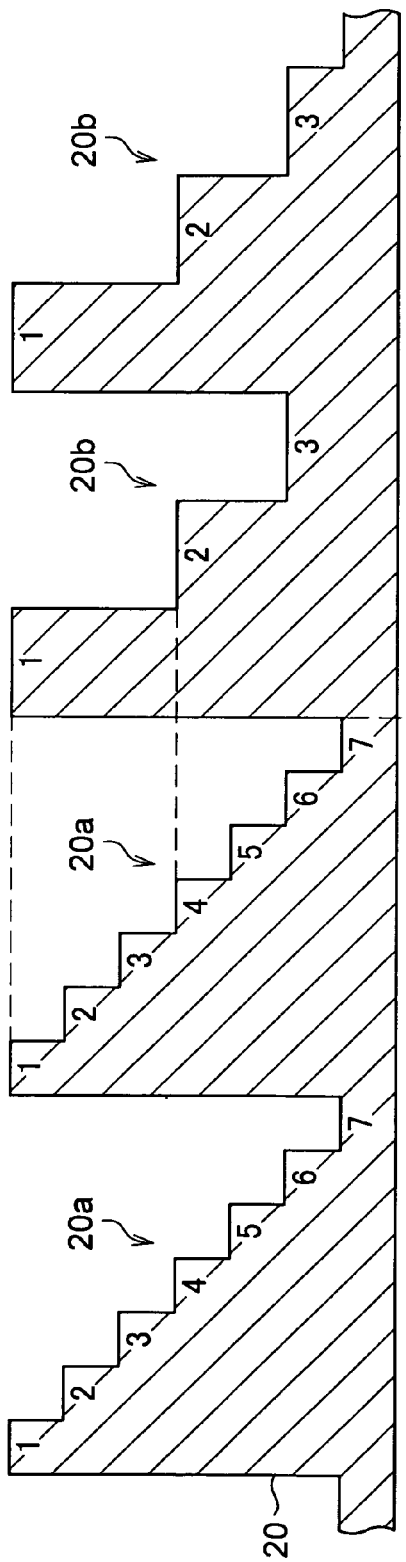
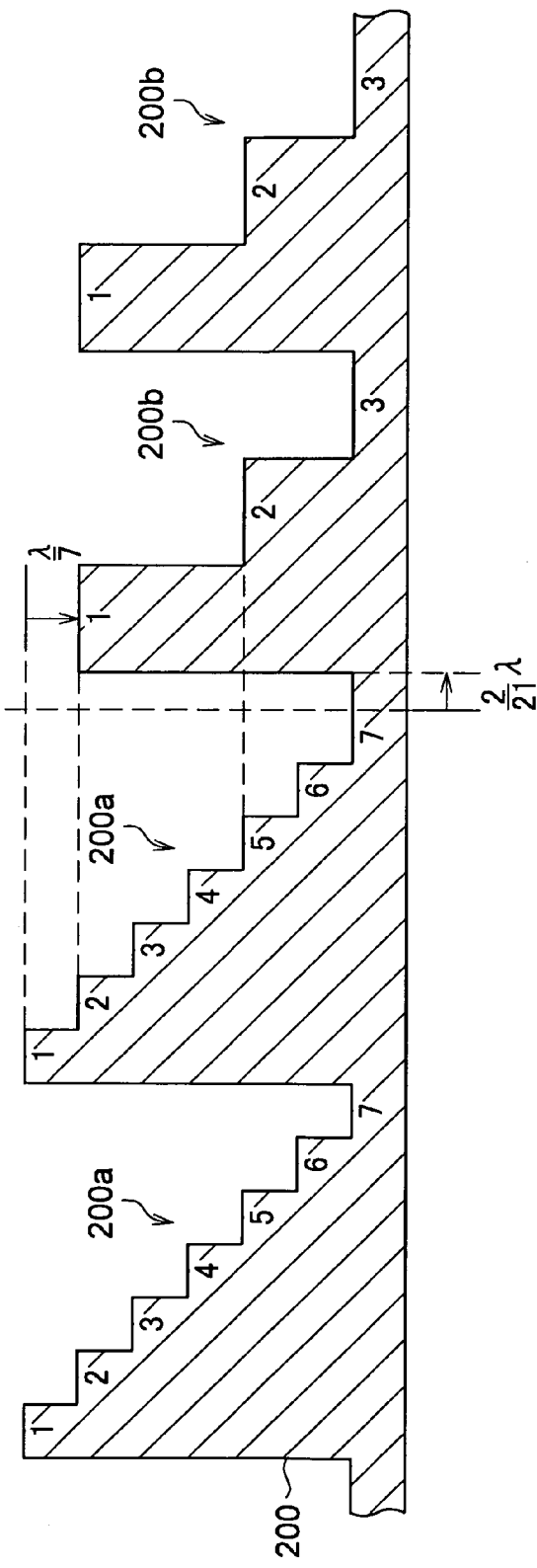
FIG.2A
FIG.2B

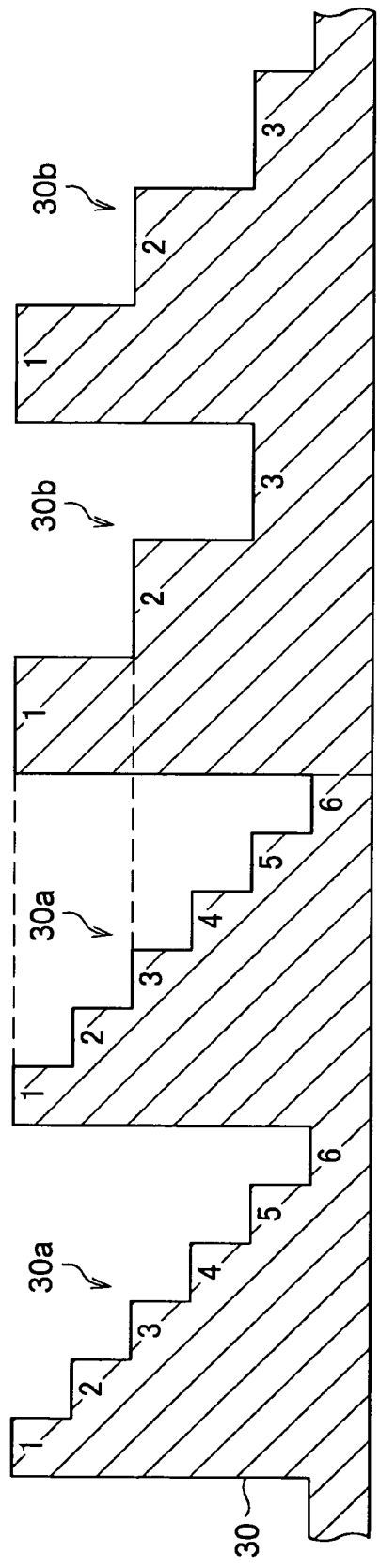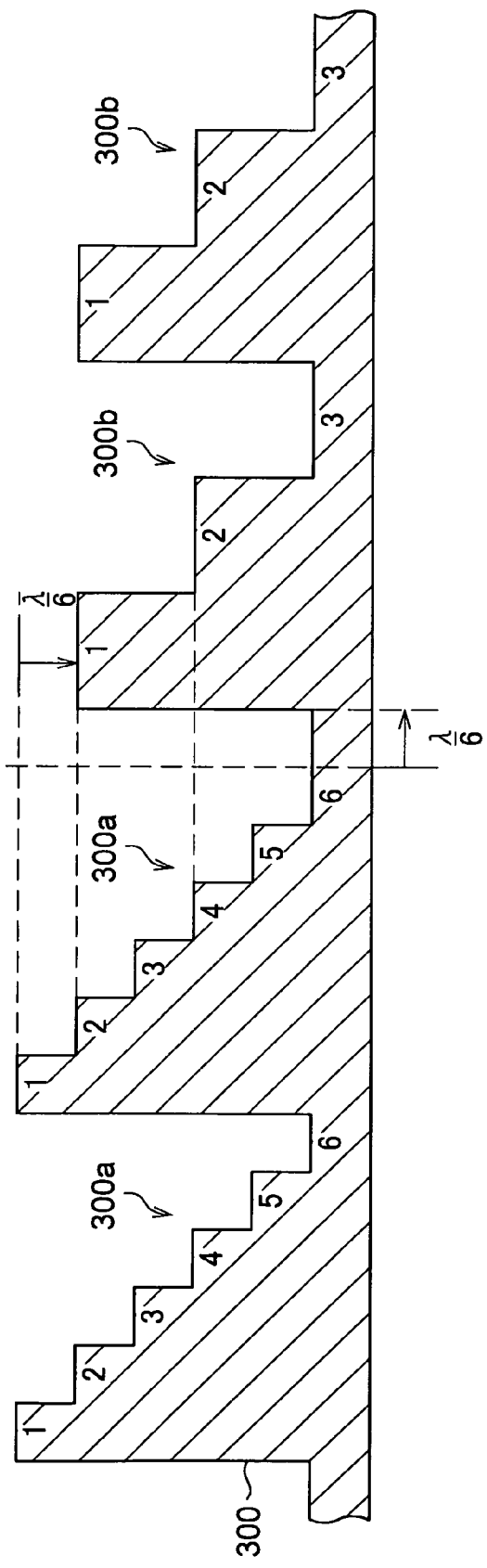
FIG.3A
FIG.3B

FIG.8
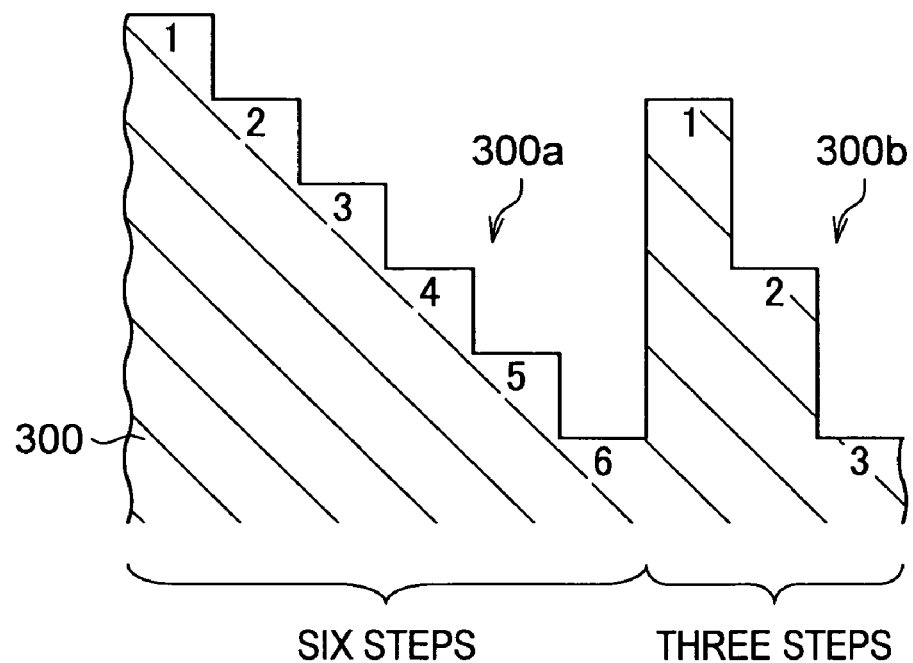

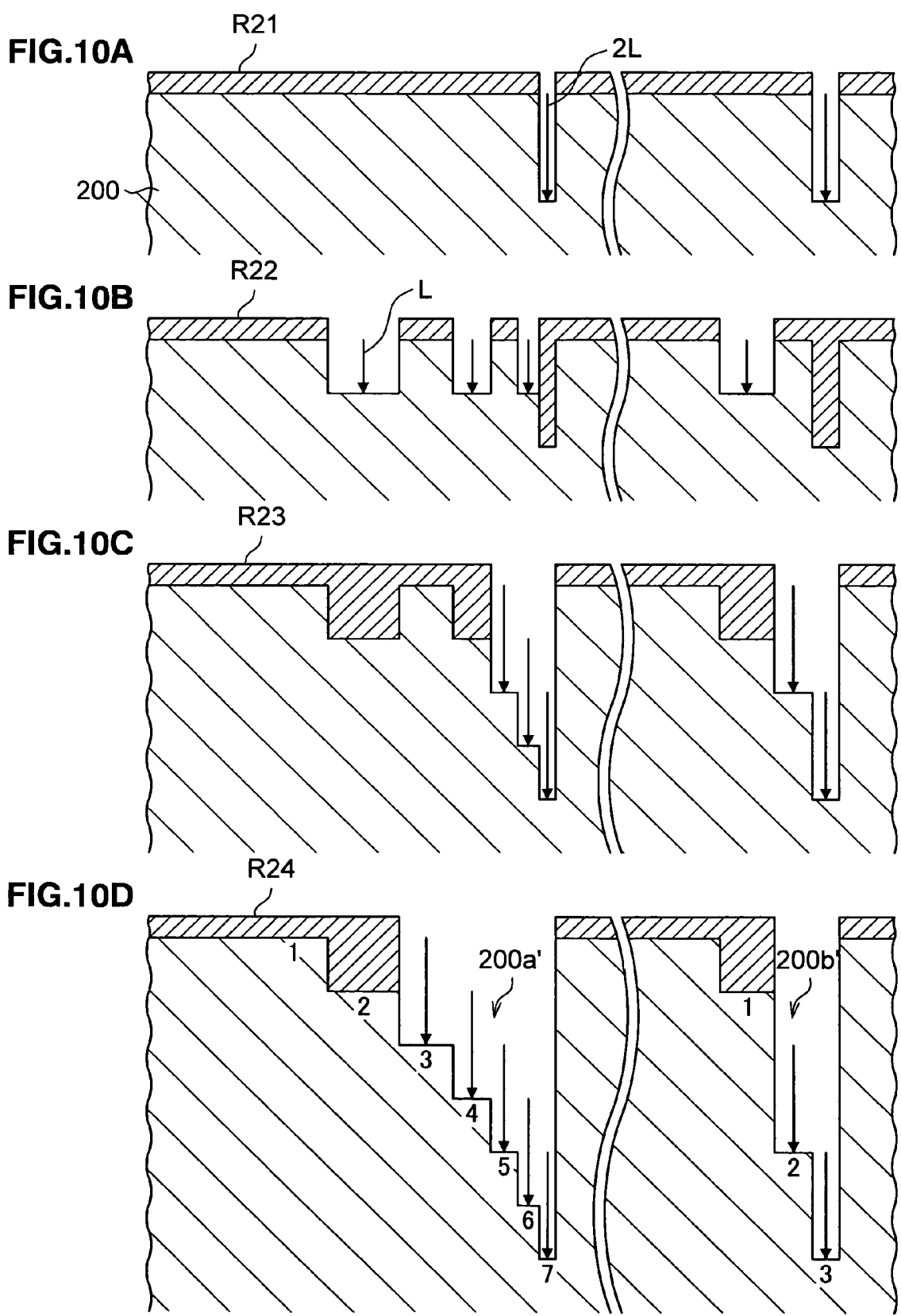

DIFFRACTION OPTICAL ELEMENT AND PRODUCTION METHOD THEREOF

CROSS REFERENCE TO RELATED APPLICATIONS

The disclosure of Japanese Patent Application No. JP2005-167918, filed Jun. 8, 2005, is entitled "DIFFRACTION OPTICAL ELEMENT AND PRODUCTION METHOD THEREOF" and the contents of that application are incorporated herein by reference in its entirety.

BACKGROUND OF THE INVENTION

1. Field of the Invention

The present invention relates to a diffraction optical element and a production method thereof, particularly to the diffraction optical element having an element formed in a staircase shape and the production method thereof.

2. Description of the Related Art

Recently, there is an increasing demand for the diffraction optical element in which a traveling direction and a phase of light are controlled by a periodic fine structure. There are various kinds of shapes of the diffraction optical elements. The diffraction optical element whose section is formed in a sawtooth shape has high diffraction efficiency in theory. However, actually the diffraction optical element having a staircase shape which is approximate to the sawtooth shape is frequently used because the staircase shape is easy to produce. Generally there is well known a method of producing the diffraction optical element having the staircase shape, in which a semiconductor fine process technology is utilized and the $2^m$-step diffraction optical element is produced by repeating a series of processes of exposure, development, and etching with m (m is a natural number) mask patterns (for example, see Japanese Patent Application Laid-Open No. 11-14813 and H. Sasaki et al., "High-accuracy packaging technology for light source and silicon micro-lens", Trans. of Japan Institute of Electronics Packaging, Vol. 5, No. 5, p. 466-472 (2002)).

In the diffraction optical element production method, for the case where a patter having a minimum line width thinner than resolving power of photolithography is produced, there is well known a method of decreasing an eight-step staircase shape to a four-step or two-step staircase shape to widen a step width as shown in FIG. 11A (for example, see Yuko Orihara, Werner Klaus, Makoto Fujino; and Kashiko Kodate, "Optimization and application of hybrid-level binary zone plates", Appl. Opt. 40, 5877-5885(2001)).

In this case, when a lens curved surface is approximated by the eight-step staircase shape and the four-step staircase shapes, a shift of a light phase is generated at a boundary between the eight-step staircase shape and the four-step staircase shapes, which results in degradation of optical characteristics of the lens. In order to prevent the degradation of the optical characteristics, Yuko Orihara, Werner Klaus, Makoto Fujino, and Kashiko Kodate, "Optimization and application of hybrid-level binary zone plates", Appl. Opt. 40, 5877-5885 (2001) discloses a method of adjusting a step (height) or a width (distance) of the staircase shape to perform phase correction.

FIG. 11B shows the phase correction for adjusting the step. In FIG. 11B, the height of the four-step staircase shape is corrected in the direction toward the lower step by $\lambda/16$, and the height of the two-step staircase shape is further corrected by $\lambda/8$. FIG. 11C shows the phase correction for adjusting the width. In FIG. 11C, the four-step staircase shape is corrected in the direction toward the eight-step staircase shape by $\lambda/18$, and the two-step staircase shape is further corrected in the direction toward the four-step staircase shape by $\lambda/4$ ($\lambda/8+\lambda/4$ in total).

However, there are the following problems in the phase correction shown in FIGS. 11B and 11C.

(1) Phase Correction by Step

In the eight-step staircase shape, the staircase shape is usually produced by etching of depths of $\lambda/8$, $\lambda/4$, and $\lambda/2$. However, because it is necessary to form the step of $\lambda/16$ at the boundary between the eight-step staircase shape and the four-step staircase shape, it is necessary to add an etching process. Further, due to the additional etching process, it is necessary to add the one or two mask patterns.

(2) Phase Correction by Width

In order to eliminate the boundary between the eight-step staircase shape and the four-step staircase shape or the boundary between the four-step staircase shape and the eight-step staircase shape, as shown in FIG. 11C, it is necessary to form thinner line width. Because the switch portion between the staircase shapes having the different step numbers is formed by a resolution limit portion, it is actually difficult to produce the portion having further thinner line width.

SUMMARY OF THE INVENTION

In view of the foregoing, an object of the invention is to provide a novel and improved diffraction optical element in which the phase correction can be performed without adding the etching process and without restriction of the resolving power of photolithography, and a diffraction optical element production method.

In order to solve the above problems, a first aspect of the present invention discloses a diffraction optical element. According to the diffraction optical element, an element having an n-step staircase shape and an element having an m-step staircase shape (n>m) are formed on one substrate, and a first step of the m-step staircase shape is formed to the same height as a second step of the n-step staircase shape.

According to the configuration of the invention, the staircase shape can be produced only through etching by one-step depth, and the multiple-step type diffraction optical element in which the phase correction can be performed without adding the mask pattern and etching process can be produced. The phase correction in a crosswise direction is performed in a direction in which a distance is widened, so that the staircase shape can be produced, even if the line width is in the limit area of the photolithography.

In the diffraction optical element according to the invention, all the steps of the m-step staircase shape may be formed to the same height as any one of steps of the n-step staircase shape.

Further, it is possible that phase correction between the n-step staircase shape and the m-step staircase shape is $(1/m-1/n)\pi$, the phase correction in a step direction is $A\pi$ (direction toward a lower step being positive), the phase correction in a direction orthogonal to the step direction is $B\pi$ (direction in which the m-step staircase shape is brought close to the n-step staircase shape being positive), $A>(1/m-1/n)$, and $A+B=1/m-1/n$.

Generally, $(1/m-1/n)\pi$ is a phase difference between an n-step staircase shape and an m-step staircase shape. Accordingly, assuming that $A\pi$ is phase correction in a step direction (direction toward the lower step being positive) and $B\pi$ is phase correction in a direction orthogonal to the step direction (direction in which the m-step staircase shape is brought close to the n-step staircase shape being positive), it is required to satisfy A+B=1/m−1/n. At this point, letting A>(1/m−1/n) leads to B<0. That is, the phase correction in the direction orthogonal to the height direction of a step can be set at the direction in which the m-step staircase shape is moved away from the n-step staircase shape. Thus, the phase correction in the direction orthogonal to the step direction is the direction in which the distance between the staircase shapes is widened, so that the staircase shape can easily be produced, even if the line width is in the limit area of the photolithography.

Further, a width of a connection portion between the n-step staircase shape and the m-step staircase shape may be set wider than a width of an n-th step of the n-step staircase shape.

Specifically, n can be set at seven, and m can be set at three. Even in the extremely complicated phase correction like the phase correction between the seven-step staircase shape and the three-step staircase shape, the staircase shape can be designed suitable to the production process to perform the phase correction by adjusting the staircase shape in a vertical direction and in a horizontal direction. A lens element having the seven-step staircase shape and the three-step staircase shape can be produced, and the optical characteristics such as the diffraction efficiency can largely be improved in the lens element.

In order to solve the above problems, a second aspect of the present invention discloses a diffraction optical element production method. According to the diffraction optical element production method, an element having an eight-step staircase shape, an element having a four-step staircase shape, and an element having a two-step staircase shape are formed on one substrate to produce a diffraction optical element by repeating a process of performing surface fabrication of a substrate by etching, and the diffraction optical element production method includes:

a first step of etching areas which become second, fourth, sixth, and eighth steps of the eight-step staircase shape, areas which become first, second, third, and fourth steps of the four-step staircase shape, and areas which become first and second steps of the two-step staircase shape by a depth L which is the height of a step of the staircase shape;

a second step of etching areas which become seventh and eighth steps of the eight-step staircase shape, an area which becomes a fourth step of the four-step staircase shape, and an area which becomes a second step of the two-step staircase shape by a depth 2L which is double the height of a step of the staircase shape;

a third step of etching areas which become fifth, sixth, seventh, and eighth steps of the eight-step staircase shape, areas which become third and fourth steps of the four-step staircase shape, and an area which becomes second step of the two-step staircase shape by the depth 2L; and a fourth step of etching areas which become third, fourth, fifth, sixth, seventh, and eighth steps of the eight-step staircase shape, areas which become second, third, and fourth steps of the four-step staircase shape, and areas which become first and second steps of the two-step staircase shape by the depth 2L.

According to the production method of the invention, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography.

In another diffraction optical element production method according to the present invention, an element having a seven-step staircase shape and an element having a three-step staircase shape are formed on one substrate to produce a diffraction optical element by repeating a process of performing surface fabrication of a substrate by etching, and the diffraction optical element production method includes:

a first step of etching an area which becomes seventh step of the seven-step staircase shape and an area which becomes a third step of the three-step staircase shape by a depth 2L which is double the height of a step of the staircase shape;

a second step of etching areas which become second, fourth, and sixth steps of the seven-step staircase shape and an area which becomes a first step of the three-step staircase shape by a depth L which is the step of the staircase shape;

a third step of etching areas which become fifth, sixth, and seventh steps of the seven-step staircase shape and areas which become second and third steps of the three-step staircase shape by the depth 2L; and a fourth step of etching areas which become third, fourth, fifth, sixth, and seventh steps of the seven-step staircase shape and areas which become second and third steps of the three-step staircase shape by the depth 2L.

According to the production method of the invention, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography. Even in the extremely complicated phase correction like the phase correction between the seven-step staircase shape and the three-step staircase shape, the staircase shape can be designed suitable to the production process to perform the phase correction by adjusting the staircase shape in the vertical direction and in the horizontal direction. The lens element having the seven-step staircase shape and the three-step staircase shape can be produced, and the optical characteristics such as the diffraction efficiency can largely be improved in the lens element.

According to another diffraction optical element production method of the present invention, an element having a six-step staircase shape and an element having a three-step staircase shape are formed on one substrate to produce a diffraction optical element by repeating a process of performing surface fabrication of a substrate by etching, and the diffraction optical element production method includes:

a first step of etching areas which become second, fourth, and sixth steps of the six-step staircase shape and areas which become first, second, and third steps of the three-step staircase shape by a depth L which is the height of a step of the staircase shape;

a second step of etching areas which become fifth and sixth steps of the six-step staircase shape and an area which becomes a third step of the three-step staircase shape by a depth 2L which is double the height of a step of the staircase shape; and a third step of etching areas which become third, fourth, fifth, and sixth steps of the six-step staircase shape and areas which become second and third steps of the three-step staircase shape by the depth 2L.

According to the production method of the invention, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography.

According to the diffraction optical element production method of the invention, the etching may be anisotropic etching.

Further, the substrate may be made of any one of silicon, quartz, GaAs, and InP.

Thus, the invention can provide the diffraction optical element in which the phase correction can be performed without adding the etching process and without the restriction of the resolving power of the photolithography, and the diffraction optical element production method.

BRIEF DESCRIPTION OF THE DRAWINGS

FIG. 1A shows a diffraction optical element according to a first embodiment of the invention before phase correction is performed, and FIG. 1B shows the diffraction optical element according to the first embodiment after the phase correction is performed;

FIG. 2A shows a diffraction optical element according to a second embodiment before the phase correction is performed, and FIG. 2B shows the diffraction optical element according to the second embodiment after the phase correction is performed;

FIG. 3A shows a diffraction optical element according to a third embodiment before the phase correction is performed, and FIG. 3B shows the diffraction optical element according to the third embodiment after the phase correction is performed;

FIG. 8 shows a relationship between a mask pattern and a staircase shape in a process of producing a diffraction optical element according to a sixth embodiment;

FIG. 10 shows an application example of the process of producing the diffraction optical element.

DETAILED DESCRIPTION OF THE PREFERRED EMBODIMENTS

Figure 4:
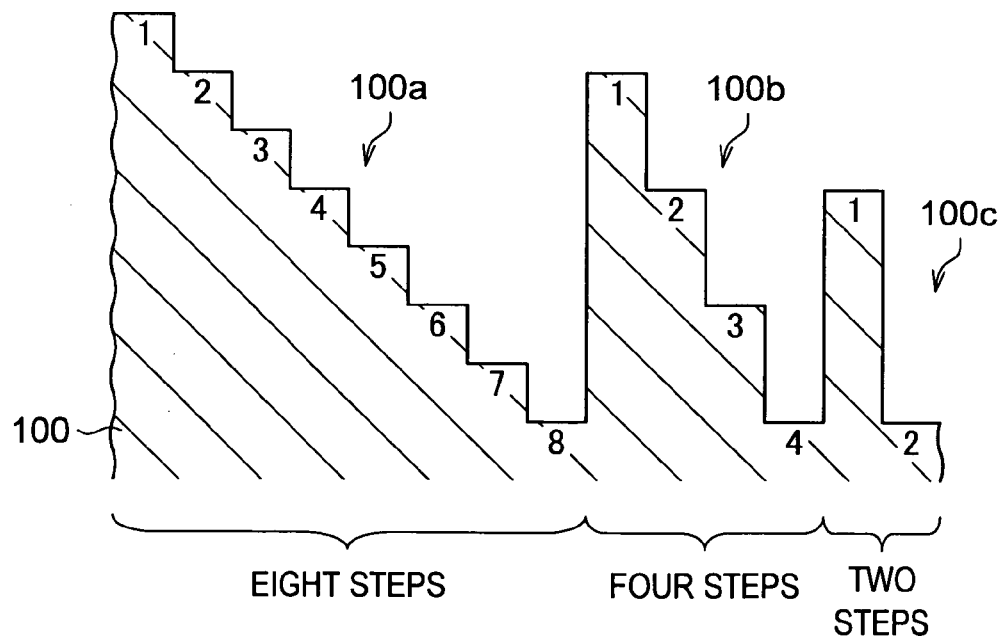
FIG. 4 shows a relationship between a mask pattern and a staircase shape in a process of producing a diffraction optical element according to a fourth embodiment.

Then, preferred embodiments of a diffraction optical element and a production method thereof according to the invention will be described in detail with reference to the accompanying drawings. In the specification and drawings, a component having a substantially same function and configuration is designated by the same reference numeral, and the repeated description will be omitted.

First Embodiment

FIG. 1 schematically shows a diffraction optical element having eight-step, four-step, and two-step staircase shapes.

FIG. 1A shows a shape of a silicon wafer 10 in which the phase correction is not performed, and FIG. 1B shows a shape of a silicon wafer 100 in which the phase correction is performed. In FIG. 1, two eight-step staircase shapes, two four-step staircase shapes, and two two-step staircase shapes are shown for the purpose of explanation. However, the number of staircase shapes is not limited to the example shown in FIG. 1. In each staircase shape, step width is kept constant, and the step height is also kept constant.

The pre-phase-correction shape of the diffraction optical element will be described with reference to FIG. 1A.

In the silicon wafer 10 shown in FIG. 1A, a first step of a four-step staircase shape 10b is formed to the same height as a first step of an eight-step staircase shape 10a. A height of a step of the four-step staircase shape 10b is formed to double the height of a step of the eight-step staircase shape 10a. Therefore, any step of the four-step staircase shape 10b is formed to the same height as any one of steps of the eight-step staircase shape 10a. That is, a second step of the four-step staircase shape 10b is formed to the same height as a third step of the eight-step staircase shape 10a, a third step of the four-step staircase shape 10b is formed to the same height as a fifth step of the eight-step staircase shape 10a, and a fourth step of the four-step staircase shape 10b is formed to the same height as a seventh step of the eight-step staircase shape 10a.

Similarly, a first step of a two-step staircase shape 10c is formed to the same height as the first step of the four-step staircase shape 10b. A height of a step of the two-step staircase shape 10c is formed to double the height of the step of the four-step staircase shape 10b. Therefore, any step of the two-step staircase shape 10c is formed to the same height as any one of steps of the four-step staircase shape 10b. That is, a second step of the two-step staircase shape 10c is formed to the same height as the third step of the four-step staircase shape 10b.

In the shape shown in FIG. 1A, the width of a connection portion between the eight-step staircase shape 10a and the four-step staircase shape 10b is formed similar to the width of the eighth step of the eight-step staircase shape 10a. The width of the connection portion between the four-step staircase shape 10b and the two-step staircase shape 10c is formed similar to the width of the fourth step of the four-step staircase shape 10b.

Then, the phase correction will be described.

Generally, $(1/m-1/n)\pi$ is the phase difference between the n-step staircase shape and the m-step staircase shape (n>m) (for example, see Yuko Orihara, Werner Klaus, Makoto Fujino, and Kashiko Kodate, "Optimization and application of hybrid-level binary zone plates", Appl. Opt. 40, 5877-5885 (2001)). Magnitude for a wavelength is $\lambda/2\ \pi$ times of the phase difference, i.e., $(1/m-1/n)\lambda/2$.

The phase difference between the eight-step staircase shape and the four-step staircase shape is $(1/4-1/8)\pi=\pi/8$, and the magnitude for the wavelength is $\lambda/16$. Accordingly, in FIG. 1A, a movement amount in which the four-step staircase shape 10b is moved to perform the phase correction is $\lambda/16$ in the direction toward the lower step or $\lambda/8$ in the direction in which the four-step staircase shape 10b is brought close to the eight-step staircase shape 10a. In FIG. 1B, a four-step staircase shape 100b is moved in the direction toward the lower step by $\lambda/8(=2\lambda/16)$. That is, the four-step staircase shape 100b is excessively moved by $\lambda/16$. Therefore, in order to cancel the excessive movement amount of $\lambda/16$, the four-step staircase shape 100b is moved away from an eight-step staircase shape 100a by $\lambda/8$. As a result, the phase difference between the eight-step staircase shape and the four-step staircase shape becomes π/8, and the phase correction can properly be performed.

Similarly, in the portion between the four-step staircase shape and the two-step staircase shape, the phase difference between the four-step staircase shape and the two-step staircase shape is (½−¼)π=π/4, and the magnitude for the wavelength is λ/8. Accordingly, in FIG. 1A, the movement amount in which the two-step staircase shape 10c is moved to perform the phase correction is λ/8 in the direction toward the lower step or λ/4 in the direction in which the two-step staircase shape 10c is brought close to the four-step staircase shape 10b. In the silicon wafer 100 shown in FIG. 1B, a two-step staircase shape 100c is moved in the direction toward the lower step by λ/4 (=2λ/8). That is, the two-step staircase shape 100c is excessively moved by λ/16. That is, the two-step staircase shape 100c is excessively moved by λ/8. Therefore, in order to cancel the excessive movement amount of λ/8, the two-step staircase shape 100c is moved away from the four-step staircase shape 100b by λ/4. Compared with FIG. 1A, the two-step staircase shape 100c is moved away from the four-step staircase shape 100b by (λ/8+λ/4). As a result, the phase difference between the four-step staircase shape and the two-step staircase shape becomes π/4, and the phase correction can properly be performed.

The shape of the diffraction optical element to which the phase correction is performed in the above-described manner will be described below with reference to FIG. 1B.

In the shape shown in FIG. 1B, the first step of the four-step staircase shape 100b is formed to the same height as the second step of the eight-step staircase shape 100a. Because the height of a step of the four-step staircase shape 100b is formed to double the height of a step of the eight-step staircase shape 100a, any step of the four-step staircase shape 100b is formed to the same height as any one of steps of the eight-step staircase shape 100a. That is, the second step of the four-step staircase shape 100b is formed to the same height as the fourth step of the eight-step staircase shape 100a, the third step of the four-step staircase shape 100b is formed to the same height as the sixth step of the eight-step staircase shape 100a, and the fourth step of the four-step staircase shape 100b is formed to the same height as the eighth step of the eight-step staircase shape 100a.

Similarly, the first step of the two-step staircase shape 100c is formed to the same height as the second step of the four-step staircase shape 100b. Because the height of a step of the two-step staircase shape 100c is formed to double the height of a step of the four-step staircase shape 100b, any step of the two-step staircase shape 100c is formed to the same height as any one of steps of the four-step staircase shape 100b. That is, the second step of the two-step staircase shape 100c is formed to the same height as the fourth step of the four-step staircase shape 100b.

In the shape shown in FIG. 1B, the width of the connection portion between the eight-step staircase shape 100a and the four-step staircase shape 100b is formed wider than the width of the eighth step of the eight-step staircase shape 100a by λ/8. The width of the connection portion between the four-step staircase shape 100b and the two-step staircase shape 100c is formed wider than the width of the fourth step of the four-step staircase shape 100b by (λ/8+λ/4).

Advantage of First Embodiment

According to the structure of the first embodiment, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography.

Second Embodiment

FIG. 2 schematically shows a diffraction optical element having seven-step and three-step staircase shapes. FIG. 2A shows a shape of a silicon wafer 20 in which the phase correction is not performed, and FIG. 2B shows a shape of a silicon wafer 200 in which the phase correction is performed. In FIG. 2, two seven-step staircase shapes and two three-step staircase shapes are shown for the purpose of explanation. However, the number of staircase shapes is not limited to the example shown in FIG. 2.

The pre-phase-correction shape of the diffraction optical element will be described with reference to FIG. 2A.

In the silicon wafer 20 shown in FIG. 2A, the first step of a three-step staircase shape 20b is formed to the same height as the first step of a seven-step staircase shape 20a. The height of a step of the three-step staircase shape 20b is formed to integral multiplication (double or triple in FIG. 2) of the height of a step of the seven-step staircase shape 20a. Therefore, any step of the three-step staircase shape 20b is formed to the same height as any one of steps of the seven-step staircase shape 20a. That is, the second step of the three-step staircase shape 20b is formed to the same height as the fourth step of the seven-step staircase shape 20a, and the third step of the three-step staircase shape 20b is formed to the same height as the sixth step of the seven-step staircase shape 20a.

In the shape shown in FIG. 2A, the width of the connection portion between the seven-step staircase shape 20a and the three-step staircase shape 20b is formed equal to the width of the seventh step of the seven-step staircase shape 20a.

Then, the phase correction will be described.

The phase difference between the seven-step staircase shape and the three-step staircase shape is (⅓−⅐)π=4λ/21, and the magnitude for the wavelength is 2λ/21. Accordingly, in FIG. 2A, the movement amount in which the three-step staircase shape 20b is moved to perform the phase correction is 2λ/21 in the direction toward the lower step or 4λ/21 in the direction in which the three-step staircase shape 20b is brought close to the seven-step staircase shape 20a. In the silicon wafer 200 shown in FIG. 2B, a three-step staircase shape 200b is moved in the direction toward the lower step by λ/7 (=3λ/21). That is, the three-step staircase shape 200b is excessively moved by λ/21. Therefore, in order to cancel the excessive movement amount of λ/21, the three-step staircase shape 200b is moved away from a seven-step staircase shape 200a by 2λ/21. As a result, the phase difference between the seven-step staircase shape and the three-step staircase shape becomes 4π/21, and the phase correction can properly be performed.

The shape of the diffraction optical element to which the phase correction is performed in the above-described manner will be described below with reference to FIG. 2B.

In the shape shown in FIG. 2B, the first step of the three-step staircase shape 200b is formed to the same height as the second step of the seven-step staircase shape 200a. Because the height of a step of the three-step staircase shape 200b is formed to integral multiplication (double or triple in FIG. 2) of the height of a step of the seven-step staircase shape 200a, any step of the three-step staircase shape 200b is formed to the same height as any one of steps of the seven-step staircase shape 200a. That is, the second step of the three-step staircase shape 200b is formed to the same height as the fifth step of the seven-step staircase shape 200a, and the third step of the three-step staircase shape 200b is formed to the same height as the seventh step of the seven-step staircase shape 200a.

In the shape shown in FIG. 2B, the width of the connection portion between the seven-step staircase shape 200a and the three-step staircase shape 200b is formed wider than the width of the seventh step of the seven-step staircase shape 200a by 2λ/21.

Advantage of Second Embodiment

According to the structure of the second embodiment, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography.

Even in the extremely complicated phase correction like the phase correction between the seven-step staircase shape and the three-step staircase shape, the staircase shape can be designed suitable to the production process to perform the phase correction by adjusting the staircase shape in the vertical direction and in the horizontal direction.

Third Embodiment

FIG. 3 schematically shows a diffraction optical element having six-step and three-step staircase shapes. FIG. 3A shows a shape of a silicon wafer 30 in which the phase correction is not performed, and FIG. 3B shows a shape of a silicon wafer 300 in which the phase correction is performed. In FIG. 3, two six-step staircase shapes and two three-step staircase shapes are shown for the purpose of explanation. However, the number of staircase shapes is not limited to the example shown in FIG. 3.

The pre-phase-correction shape of the diffraction optical element will be described with reference to FIG. 3A.

In the silicon wafer 30 shown in FIG. 3A, the first step of a three-step staircase shape 30b is formed to the same height as the first step of a six-step staircase shape 30a. The height of a step of the three-step staircase shape 30b is formed to double the height of a step of the six-step staircase shape 30a. Therefore, any step of the three-step staircase shape 30b is formed to the same height as any one of steps of the six-step staircase shape 30a. That is, the second step of the three-step staircase shape 30b is formed to the same height as the third step of the six-step staircase shape 30a, and the third step of the three-step staircase shape 30b is formed to the same height as the fifth step of the six-step staircase shape 30a.

In the shape shown in FIG. 3A, the width of the connection portion between the six-step staircase shape 30a and the three-step staircase shape 30b is formed equal to the width of the sixth step of the six-step staircase shape 30a.

Then, the phase correction will be described.

The phase difference between the six-step staircase shape and the three-step staircase shape is $(\frac{1}{3}-\frac{1}{2})\pi=\pi/6$, and the magnitude for the wavelength is λ/12. Accordingly, in FIG. 3A, the movement amount in which the three-step staircase shape 30b is moved to perform the phase correction is λ/12 in the direction toward the lower step or λ/6 in the direction in which the three-step staircase shape 30b is brought close to the six-step staircase shape. In the silicon wafer 300 shown in FIG. 3B, a three-step staircase shape 300b is moved in the direction toward the lower step by λ/6(=2 λ/12). That is, the three-step staircase shape 300b is excessively moved by λ/12. Therefore, in order to cancel the excessive movement amount of λ/12, the three-step staircase shape 300b is moved away from a six-step staircase shape 300a by λ/6. As a result, the phase difference between the six-step staircase shape and the three-step staircase shape becomes π/6, and the phase correction can properly be performed.

The shape of the diffraction optical element to which the phase correction is performed in the above-described manner will be described below with reference to FIG. 3B.

In the shape shown in FIG. 3B, the first step of the three-step staircase shape 300b is formed to the same height as the second step of the six-step staircase shape 300a. Because the height of a step of the three-step staircase shape 300b is formed to double the height of step of the six-step staircase shape 300a, any step of the three-step staircase shape 300b is formed to the same height as any one of steps of the six-step staircase shape 300a. That is, the second step of the three-step staircase shape 300b is formed to the same height as the fourth step of the six-step staircase shape 300a, and the third step of the three-step staircase shape 300b is formed to the same height as the sixth step of the six-step staircase shape 300a.

In the shape shown in FIG. 3B, the width of the connection portion between the six-step staircase shape 300a and the three-step staircase shape 300b is formed wider than the width of the sixth step of the six-step staircase shape 300a by λ/6.

Advantage of Third Embodiment

Thus, according to the structure of the third embodiment, the staircase shape can be produced only through etching by one-step depth, and the multiple-step type diffraction optical element in which the phase correction can be performed without adding the mask pattern and etching process can be produced. The phase correction in the crosswise direction is performed in the direction in which the distance is widened, so that the staircase shape can be produced, even if the line width is in the limit area of the photolithography.

In the first to third embodiments, the structure of the diffraction optical element is described.

In the following fourth to sixth embodiments of the invention, a method of producing the diffraction optical element will be described. In the fourth to sixth embodiments, a silicon wafer (Si substrate) is used to produce the element, and an i-line stepper and a standard positive-type resist are used for the photolithography. A reactive ion etching apparatus (RIE apparatus) is used for etching, and anisotropic etching is performed using $SF_6$ as etching gas.

Fourth Embodiment

The fourth embodiment of the invention will be described below. The method of producing the diffraction optical element described in the first embodiment in which the eight-step, four-step, and two-step staircase shapes are formed will be described in the fourth embodiment.

FIG. 4 shows a relationship between mask patterns used in the processes and the diffraction optical element (final shape of the production process) described in the first embodiment in which the eight-step, four-step, and two-step staircase shapes are formed. In the fourth embodiment, as shown in FIG. 4, the etching process is performed to the silicon wafer 100 by sequentially using four mask patterns M11, M12, M13, and M14.

The mask pattern M11 is used such that the first, third, fifth, and seventh steps in the eight-step staircase shape are not etched but the one-step etching is performed other steps. The mask pattern M12 is used such that the first to sixth steps of the eight-step staircase shape, the first to third steps of the four-step staircase shape, and the first step of the two-step staircase shape are not etched but the two-step etching is performed to other steps. The mask pattern M13 is used such that the first to fourth steps of the eight-step staircase shape, the first and second steps of the four-step staircase shape, and the first step of the two-step staircase shape are not etched but the two-step etching is performed to other steps. The mask pattern M14 is used such that the first and second steps of the eight-step staircase shape and the first step of the four-step staircase shape are not etched but the two-step etching is performed to other steps.

FIG. 5 shows the processes of the method of producing the diffraction optical element according to the fourth embodiment.

Figure 5A:
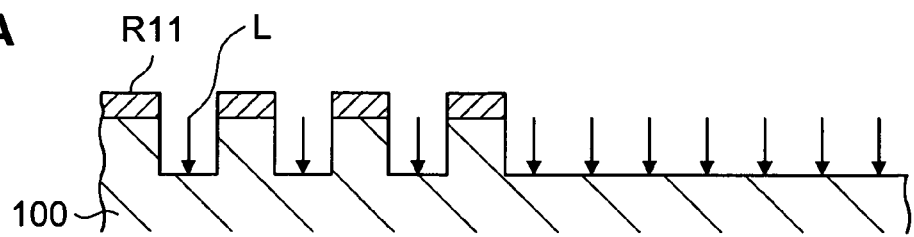
FIG. 5 shows the process of producing the diffraction optical element according to the fourth embodiment.

First a resist is applied onto the silicon wafer 100. The exposure and the development are performed with the mask pattern M11 to form a resist pattern R11 on the silicon wafer 100 as shown in FIG. 5A. The second, fourth, sixth, and eighth steps of the eight-step staircase shape, the first to fourth steps of the four-step staircase shape, and the first and second steps of the two-step staircase shape, where the resist pattern R11 is not formed, are etched by a depth L (corresponding to the height of one step).

Figure 5B:
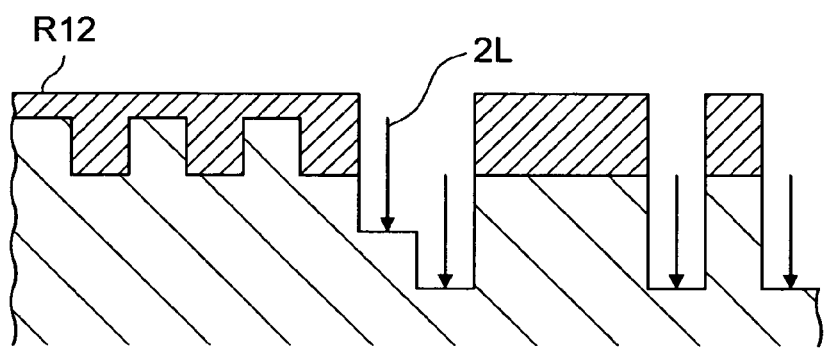

After the resist pattern R11 is removed, the resist is applied onto the silicon wafer 100. The exposure and the development are performed with the mask pattern M12 to form a resist pattern R12 on the silicon wafer 100 as shown in FIG. 5B. The seventh and eighth steps of the eight-step staircase shape, the fourth step of the four-step staircase shape, and the second step of the two-step staircase shape, where the resist pattern R12 is not formed, are etched by a depth 2L (corresponding to the height of two steps).

Figure 5C:
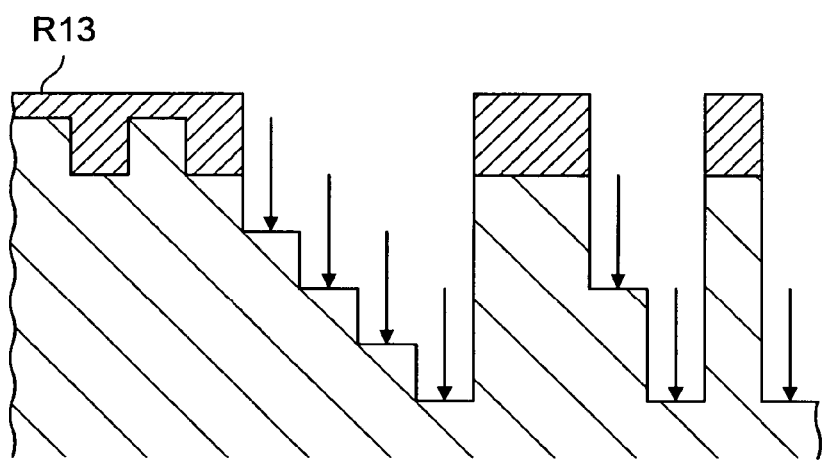

Similarly, after the resist pattern R12 is removed, a resist pattern R13 is formed on the silicon wafer 100 using the mask pattern M13 as shown in FIG. 5C. The fifth to eighth steps of the eight-step staircase shape, the third and fourth steps of the four-step staircase shape, and the second step of the two-step staircase shape, where the resist pattern R13 is not formed, are etched by the depth 2L (corresponding to the height of two steps).

Figure 5D:
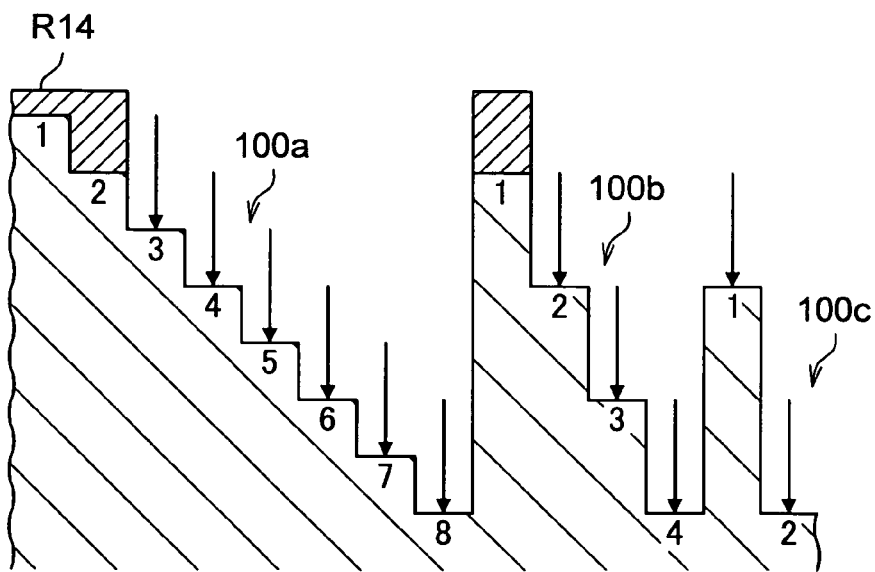

Similarly, after the resist pattern R13 is removed, a resist pattern R14 is formed on the silicon wafer 100 using the mask pattern M14 as shown in FIG. 5D. The fifth to eighth steps of the eight-step staircase shape, the second to fourth steps of the four-step staircase shape, and the first and second steps of the two-step staircase shape, where the resist pattern R14 is not formed, are etched by the depth 2L (corresponding to the height of two steps).

The diffraction optical element described in the first embodiment in which the eight-step, four-step, and two-step staircase shapes are formed is produced through the above processes. Each step width of the staircase shape and a distance between the staircase shapes can arbitrarily be set by adjusting the mask patterns M11 to M14. In the shape of the first embodiment, the adjustment can be performed such that the distance between the staircase shapes are widened, so that the diffraction optical element can easily be produced even if the line width is in the limit area of the photolithography.

Fifth Embodiment

The fifth embodiment of the invention will be described below. The method of producing the diffraction optical element described in the second embodiment in which the seven-step and three-step staircase shapes are formed will be described in the fifth embodiment.

Figure 6:
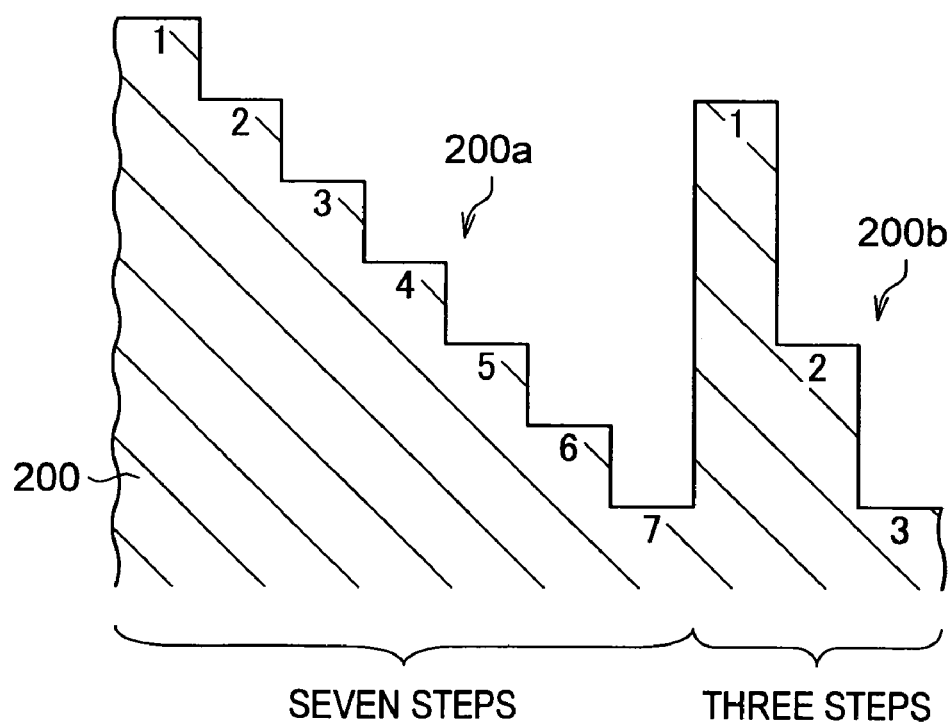
FIG. 6 shows a relationship between a mask pattern and a staircase shape in a process of producing a diffraction optical element according to a fifth embodiment.

FIG. 6 shows a relationship between mask patterns used in the processes and the diffraction optical element (final shape of the production process) described in the second embodiment in which the seven-step and two-step staircase shapes are formed. In the fifth embodiment, as shown in FIG. 6, the etching process is performed to the silicon wafer 200 by sequentially using four mask patterns M21, M22, M23, and M24.

The mask pattern M21 is used such that the first to sixth steps in the seven-step staircase shape and the first and second steps of the three-step staircase shape are not etched but the two-step etching is performed to other steps. The mask pattern M22 is used such that the first, third, and fifth steps of the seven-step staircase shape and the second and third steps of the three-step staircase shape are not etched but the one-step etching is performed to other steps. The mask pattern M23 is used such that the first to fourth steps of the seven-step staircase shape and the first step of the three-step staircase shape are not etched but the two-step etching is performed to other steps. The mask pattern M24 is used such that the first and second steps of the seven-step staircase shape and the first step of the three-step staircase shape are not etched but the two-step etching is performed to other steps.

Figure 7:
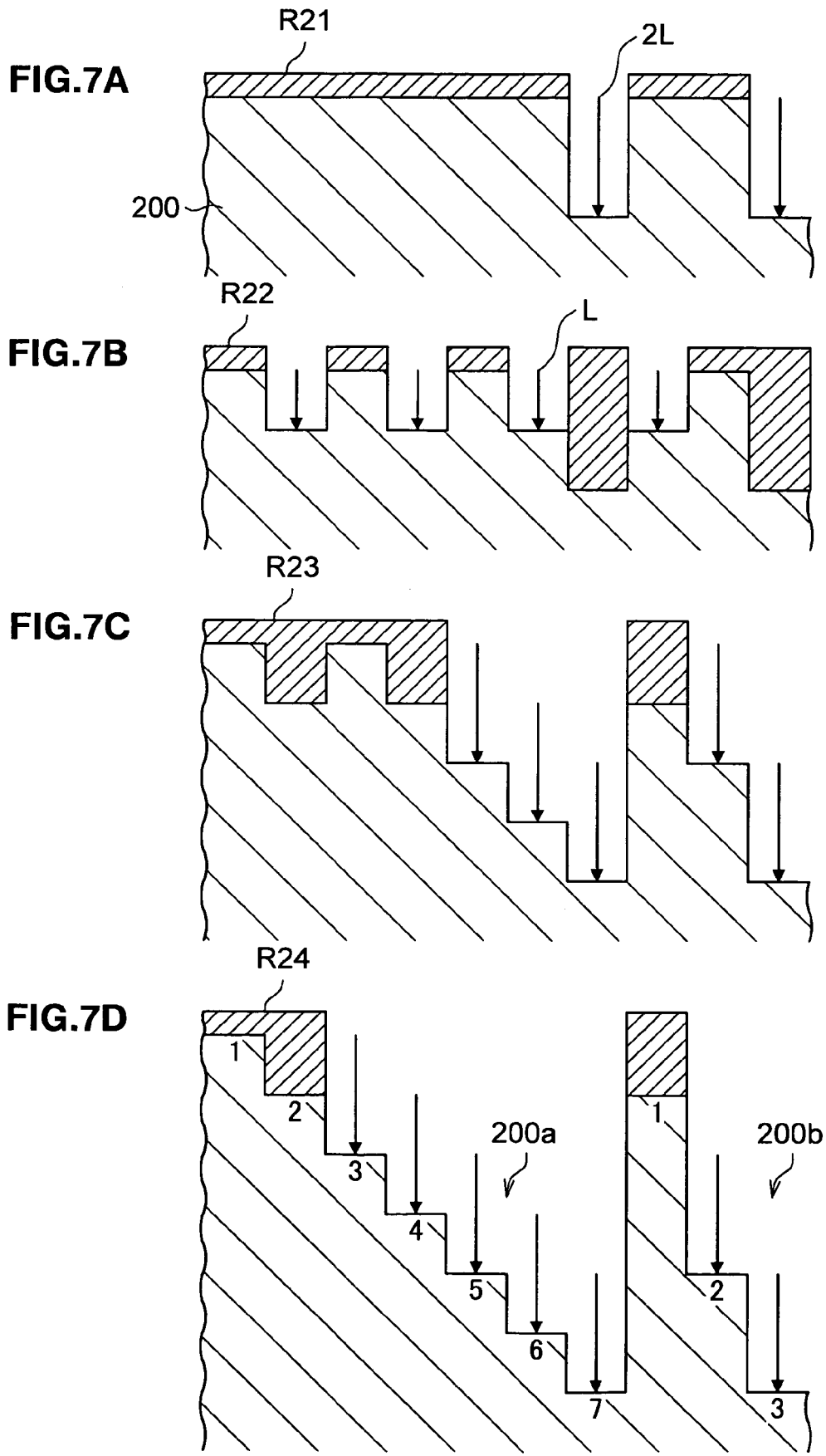
FIG. 7 shows the process of producing the diffraction optical element according to the fifth embodiment.

FIG. 7 shows the processes of the method of producing the diffraction optical element according to the fifth embodiment.

First the resist is applied onto the silicon wafer 200. The exposure and the development are performed with the mask pattern M21 to form a resist pattern R21 on the silicon wafer 200 as shown in FIG. 7A. The seventh step of the seven-step staircase shape and the third step of the three-step staircase shape, where the resist pattern R21 is not formed, are etched by the depth 2L (corresponding to the height of two steps).

After the resist pattern R21 is removed, the resist is applied onto the silicon wafer 200. The exposure and the development are performed with the mask pattern M22 to form a resist pattern R22 on the silicon wafer 200 as shown in FIG. 7B. The second, fourth, and seventh steps of the seven-step staircase shape and the first step of the three-step staircase shape, where the resist pattern R22 is not formed, are etched by the depth L (corresponding to the height of one step).

Similarly, after the resist pattern R22 is removed, a resist pattern R23 is formed on the silicon wafer 200 using the mask pattern M23 as shown in FIG. 7C. The fifth to seventh steps of the seven-step staircase shape and the second and third steps of the three-step staircase shape, where the resist pattern R23 is not formed, are etched by the depth 2L (corresponding to the height of two steps).

Similarly, after the resist pattern R23 is removed, a resist pattern R24 is formed on the silicon wafer 200 using the mask pattern M24 as shown in FIG. 7D. The third to seventh steps of the seven-step staircase shape and the second and third steps of the three-step staircase shape, where the resist pattern R24 is not formed, are etched by the depth 2L (corresponding to the height of two steps).

The diffraction optical element described in the second embodiment in which the seven-step and three-step staircase shapes are formed is produced through the above processes.

Each step width of the staircase shape and a distance between the staircase shapes can arbitrarily be set by adjusting the mask patterns M21 to M24. In the shape of the second embodiment, the adjustment can be performed such that the distance between the staircase shapes are widened, so that the diffraction optical element can easily be produced even if the line width is in the limit area of the photolithography.

According to the fifth embodiment, a staircase shape lens element can be produced. The staircase shape lens element according to the fifth embodiment has a diameter of 120 μm, the staircase shape lens element is formed in the seven-step staircase shape in the range from the center to a position 40 μm apart from the center, and three-step staircase shape in the range 40 to 60 μm apart from the center in the radial direction. The staircase shape lens element is a lens which shapes light emitted from a semiconductor laser into parallel light. When the optical characteristics of the staircase shape lens element of the fifth embodiment are measured, 87% diffraction efficiency is obtained. The conventional lens element has 84% diffraction efficiency. Therefore, in the staircase shape lens element of the fifth embodiment, the diffraction efficiency is improved by 3% compared with the conventional lens element. The diffraction efficiency is about 50% in the case where the three-step staircase shape is not formed, so that the optical characteristics can be largely improved.

Sixth Embodiment

The sixth embodiment of the invention will be described below. The method of producing the diffraction optical element described in the third embodiment in which the six-step and three-step staircase shapes are formed will be described in the sixth embodiment.

FIG. 8 shows a relationship between mask patterns used in the processes and the diffraction optical element (final shape of the production process) described in the third embodiment in which the six-step and two-step staircase shapes are formed. In the sixth embodiment, as shown in FIG. 8, the etching process is performed to the silicon wafer 300 by sequentially using three mask patterns M31, M32, and M33.

The mask pattern M31 is used such that the first, third, and fifth steps in the six-step staircase shape are not etched but the one-step etching is performed to other steps. The mask pattern M32 is used such that the first to fourth steps of the six-step staircase shape and the first and second steps of the three-step staircase shape are not etched but the two-step etching is performed to other steps. The mask pattern M33 is used such that the first and second steps of the six-step staircase shape and the first step of the three-step staircase shape are not etched but the two-step etching is performed to other steps.

FIG. 9 shows the processes of the method of producing the diffraction optical element according to the sixth embodiment.

Figure 9A:
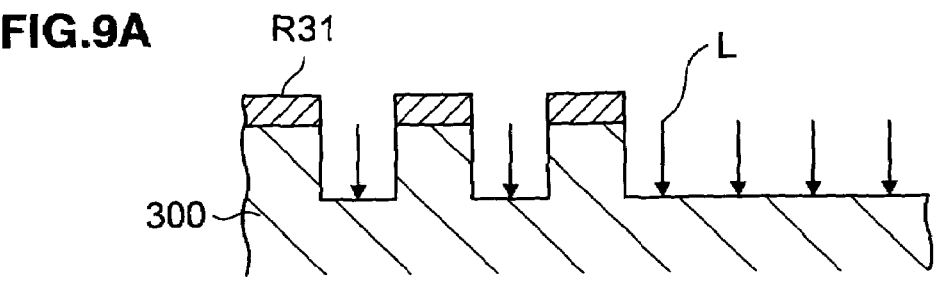
FIG. 9 shows the process of producing the diffraction optical element according to the sixth embodiment.

First the resist is applied onto the silicon wafer 300. The exposure and the development are performed with the mask pattern M31 to form a resist pattern R31 on the silicon wafer 200 as shown in FIG. 9A. The second, fourth, and sixth steps of the six-step staircase shape and the first to third steps of the three-step staircase shape, where the resist pattern R31 is not formed, are etched by the depth L (corresponding to the height of one step).

Figure 9B:
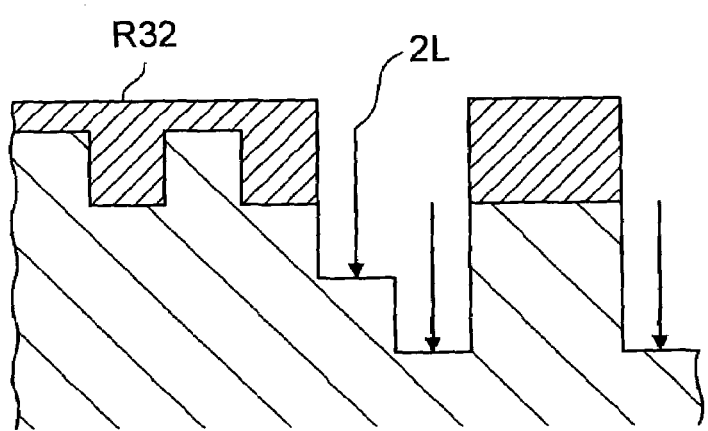

After the resist pattern R31 is removed, the resist is applied onto the silicon wafer 300. The exposure and the development are performed with the mask pattern M32 to form a resist pattern R32 on the silicon wafer 300 as shown in FIG. 9B. The fifth and sixth steps of the six-step staircase shape and the third step of the three-step staircase shape, where the resist pattern R32 is not formed, are etched by the depth 2L (corresponding to the height of two steps).

Figure 9C:
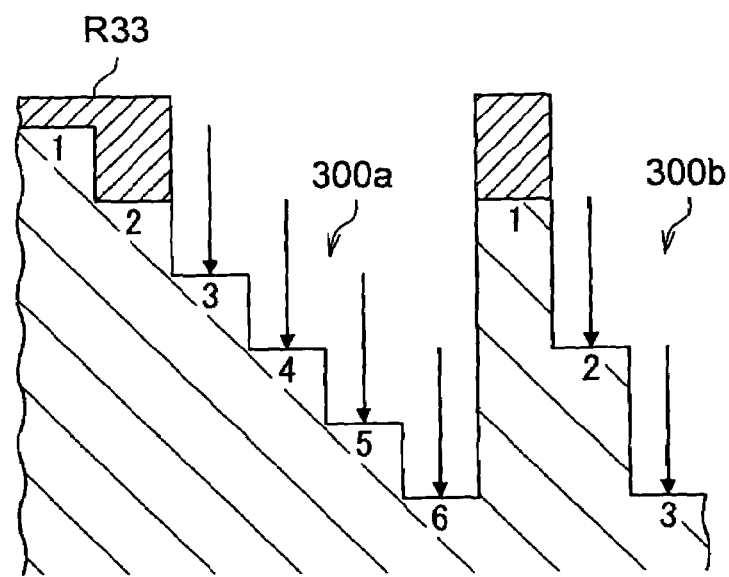
Figure 11A:
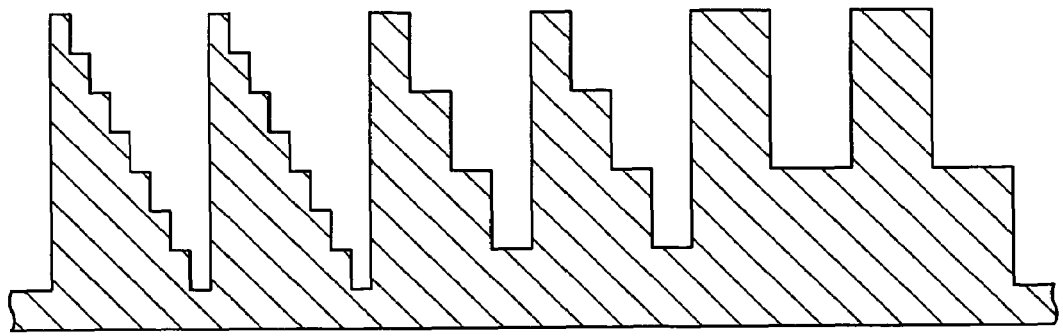
FIG. 11 shows a conventional diffraction optical element.
Figure 11B:
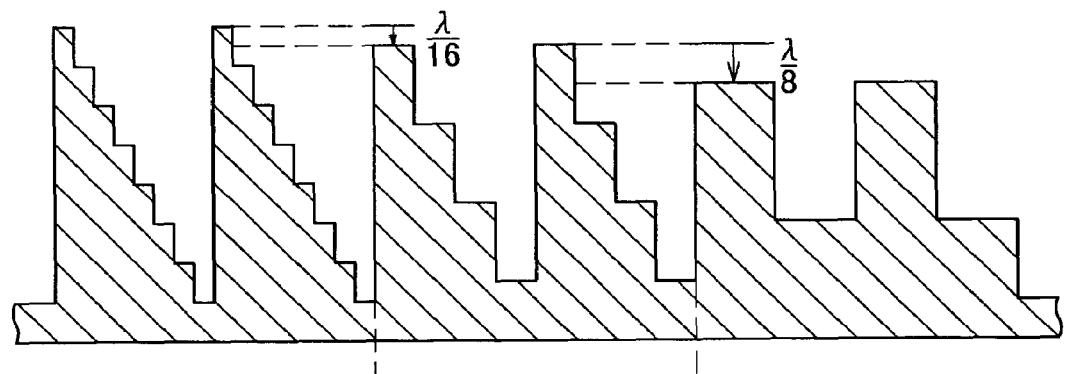
Figure 11C:
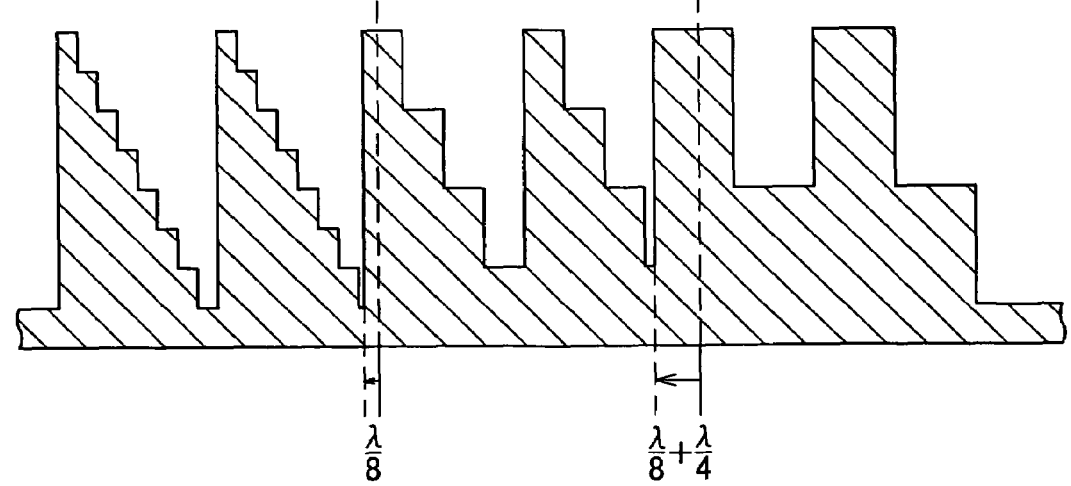

Similarly, after the resist pattern R32 is removed, a resist pattern R33 is formed on the silicon wafer 300 using the mask pattern M33 as shown in FIG. 9C. The third to sixth steps of the six-step staircase shape and the second and third steps of the three-step staircase shape, where the resist pattern R33 is not formed, are etched by the depth 2L (corresponding to the height of two steps).

The diffraction optical element described in the third embodiment in which the six-step and three-step staircase shapes are formed is produced through the above processes. Each step width of the staircase shape and a distance between the staircase shapes can arbitrarily be set by adjusting the mask patterns M31 to M33. In the shape of the third embodiment, the adjustment can be performed such that the distance between the staircase shapes are widened, so that the diffraction optical element can easily be produced even if the line width is in the limit area of the photolithography.

Thus, the preferred embodiments of the diffraction optical element and production method thereof according to the invention are described with reference to the accompanying drawings. However, the invention is not limited to the above embodiments. It is further understood by those skilled in the art that various changes and modifications may be made without departing from the spirit and scope of the invention.

For example, in the above embodiments, the diffraction optical element is produced with the silicon wafer. However, the invention is not limited to the silicon wafer, but the diffraction optical element can be produced with glass, germanium, InP, and the like. For the silicon wafer etching, the invention is not limited to the above-described method, but an arbitrary method that can produce the desired staircase shape can be adopted in the invention.

Although the staircase shape width is kept constant in the above embodiments, the staircase shape width can arbitrarily set by appropriately adjusting the mask pattern. The distance between the staircase shapes can also arbitrarily set. As an example, FIG. 10 shows the diffraction optical elements having the seven-step and three-step staircase shapes described in the second and fifth embodiments. The processes shown in FIGS. 10A to 10D are similar to those of FIGS. 7A to 7D of the fifth embodiment. However, as shown in FIG. 10D, the widths of staircase shapes 200a' and 200b' is formed narrower as the staircase shape progresses from the first step to the third step. Further, the distance between the staircase shapes can sufficiently widely formed.

In the above embodiments, the resist pattern is formed with the mask pattern. However, the invention is not limited to the mask pattern, but a method of directly drawing the resist pattern with an electron beam may be adopted. For the resist used, the invention is not limited to the positive-type resist, but a negative-type resist may be used. In this case, the inverted mask pattern is used. In the photolithographic process, in addition to the i-line stepper, another photolithographic method such as x-ray photolithography may be adopted. For example, the above Fresnel lens type diffraction optical element is applied to a laser collimator lens for optical communication and a collective lens for photodiode.

As described above, the invention can be applied to the diffraction optical element and the production method thereof, particularly to the diffraction optical element having the staircase shape element and the production method thereof.

What is claimed is:

1. A diffraction optical element in which an element having an n-step staircase shape and an element having an m-step staircase shape (n>m) are formed on one substrate, wherein a first step of the m-step staircase shape is formed to the same height as a second step of the n-step staircase shape, and wherein phase correction between the n-step staircase shape and the m-step staircase shape is $(1/m-1/n)\pi$, the phase correction in a step direction is $A\pi$ (direction toward a lower step being positive), the phase correction in a direction orthogonal to the step direction is $B\pi$ (direction in which the m-step staircase shape is brought close to the n-step staircase shape being positive), $A>(1/m-1/n)$, and $A+B=1m-1/n$.

2. A diffraction optical element according to claim 1, wherein all the steps of the m-step staircase shape are formed to the same height as any one of steps of the n-step staircase shape.

3. A diffraction optical element according to claim 1, wherein a width of a connection portion between the n-step staircase shape and the m-step staircase shape is wider than a width of an n-th step of the n-step staircase shape.

4. A diffraction optical element according to claim 1, wherein n is seven and m is three.

* * * * *